(12) United States Patent
Kalisz et al.

(10) Patent No.: US 8,336,908 B1
(45) Date of Patent: Dec. 25, 2012

(54) INSERT MOLDED TPO CHUTE FOR AUTOMOTIVE AIR BAG SYSTEM

(75) Inventors: Raymond E. Kalisz, Livonia, MI (US); Kenneth J. Kwasnik, Shelby Township, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 13/204,942

(22) Filed: Aug. 8, 2011

(51) Int. Cl.
*B60R 21/2165* (2011.01)
(52) U.S. Cl. .................................................. 280/728.3
(58) Field of Classification Search ................ 280/728.3
See application file for complete search history.

(56) References Cited

U.S. PATENT DOCUMENTS

| | | | | |
|---|---|---|---|---|
| 5,533,748 | A * | 7/1996 | Wirt et al. ................... | 280/728.3 |
| 5,536,037 | A * | 7/1996 | Cherry ........................ | 280/728.3 |
| 5,738,366 | A * | 4/1998 | Phillion ...................... | 280/728.2 |
| 6,789,816 | B2 | 9/2004 | Mar et al. | |
| 7,007,970 | B2 * | 3/2006 | Yasuda et al. .............. | 280/728.3 |
| 7,291,301 | B2 * | 11/2007 | Cowelchuk et al. ........... | 264/241 |
| 7,405,008 | B2 * | 7/2008 | Domine et al. .............. | 428/516 |
| 7,458,604 | B2 * | 12/2008 | Hier et al. ................... | 280/728.3 |
| 7,914,039 | B2 * | 3/2011 | Mazzocchi et al. ........... | 280/732 |
| 8,181,987 | B2 * | 5/2012 | Mazzocchi et al. ......... | 280/728.3 |
| 2003/0011174 | A1 * | 1/2003 | Merrifield et al. ......... | 280/728.3 |
| 2003/0189321 | A1 * | 10/2003 | Takahashi .................. | 280/728.3 |
| 2004/0126532 | A1 * | 7/2004 | Gardner, Jr. ..................... | 428/43 |
| 2005/0269804 | A1 * | 12/2005 | Yamada et al. ............ | 280/728.3 |
| 2007/0187930 | A1 | 8/2007 | Chitteti et al. | |
| 2008/0038569 | A1 * | 2/2008 | Evans et al. ................ | 428/474.9 |
| 2008/0128943 | A1 | 6/2008 | Hager | |
| 2008/0136146 | A1 | 6/2008 | Kong | |
| 2010/0090367 | A1 | 4/2010 | Kong | |
| 2010/0187722 | A1 * | 7/2010 | Fiammengo .................. | 264/255 |
| 2010/0295275 | A1 | 11/2010 | Yeon et al. | |
| 2011/0115201 | A1 | 5/2011 | Best et al. | |
| 2011/0123739 | A1 | 5/2011 | Ciplijauskas et al. | |

\* cited by examiner

*Primary Examiner* — Drew Brown
(74) *Attorney, Agent, or Firm* — Raymond L. Coppiellie; MacMillan, Sobanski & Todd, LLC

(57) ABSTRACT

An automotive air bag system for a vehicle includes an instrument panel substrate comprised a first moldable thermoplastic characterized by a first melting temperature. The instrument panel substrate has a substantially smooth outer surface for facing a passenger compartment of the vehicle. A chute is comprised a second moldable thermoplastic characterized by a second melting temperature lower than the first melting temperature. The chute includes an in-mold tear seam and a hinge for an air bag deployment door and a passageway for guiding an inflating air bag to the deployment door. The chute is attached to an inner surface of the instrument panel substrate by insert molding in which injection of the first moldable thermoplastic causes a partial melting of the second moldable thermoplastic.

16 Claims, 4 Drawing Sheets

INSERT MOLDED TPO CHUTE FOR AUTOMOTIVE AIR BAG SYSTEM

CROSS REFERENCE TO RELATED APPLICATIONS

Not Applicable.

STATEMENT REGARDING FEDERALLY SPONSORED RESEARCH

Not Applicable.

BACKGROUND OF THE INVENTION

The present invention relates in general to automotive air bag systems, and, more specifically, to a hidden air bag deployment door formed by an instrument panel substrate and a molded air bag chute.

Air bag deployment chute assemblies have been put into commercial use for the passenger side of an instrument panel of automotive vehicles. The chute assembly couples an air bag module (typically containing a folded canvas bag and chemical propellants for inflating the bag on command) to a door support panel or substrate of the instrument panel. A typical structure for a chute assembly includes a tubular outer wall, one or more door flaps, a flange surrounding the door area, and one or more hinge members or areas connecting the door flaps to the outer wall and flange.

For styling purposes, it is desirable for the air bag deployment door in the instrument panel to be invisible when viewed from the passenger compartment. In other words, the visible or "Class A" surface of the instrument panel is preferably seamless. Therefore, a pre-weakened seam is required in the substrate (on the "Class B" side) to facilitate tearing open of the door during air bag deployment.

A common material for an instrument panel substrate is injection molded thermoplastic. However, when a tear seam is in-molded in such a substrate, a potential problem occurs that is known as read-through. In read-through, the narrowed thickness of the substrate at the in-molded seam causes visible distortion in the form of a groove on the Class A surface that forms during cooling of the molded material. Therefore, secondary operations have been required such as either 1) laser scoring or milling to cut a pre-weakened seam in the Class B surface that cannot be seen from the Class A surface, or 2) allowing the read-through to occur but then covering the instrument panel substrate with an outer skin layer to hide the read-through seam. The secondary operations increase manufacturing and/or material costs.

Another issue relating to conventional chute assemblies is the need to attach the chute to the instrument panel substrate. One common method to attach a chute has been vibration welding, but the known processes can be costly and it has been difficult to obtain a desired robustness of the attachment.

SUMMARY OF THE INVENTION

In one aspect of the invention, an automotive air bag system is provided for a vehicle. An instrument panel substrate comprises a first moldable thermoplastic characterized by a first melting temperature. The instrument panel substrate has a substantially smooth outer surface for facing a passenger compartment of the vehicle. A chute comprises a second moldable thermoplastic characterized by a second melting temperature lower than the first melting temperature. The chute includes an in-mold tear seam and a hinge for an air bag deployment door and a passageway for guiding an inflating air bag to the deployment door. The chute is attached to an inner surface of the instrument panel substrate by insert molding in which injection of the first moldable thermoplastic caused a partial melting of the second moldable thermoplastic.

DETAILED DESCRIPTION OF PREFERRED EMBODIMENTS

Figure 1:
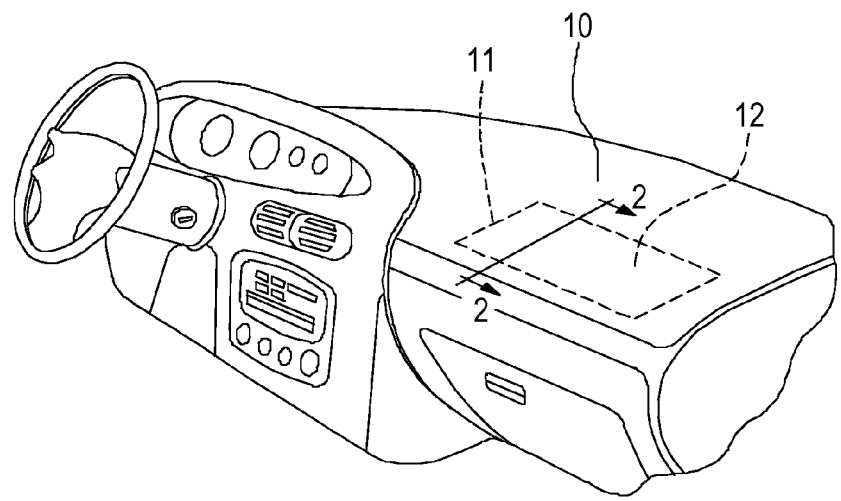
FIG. 1 is a perspective view of an automotive instrument panel system showing a passenger air bag deployment area.
Figure 2:
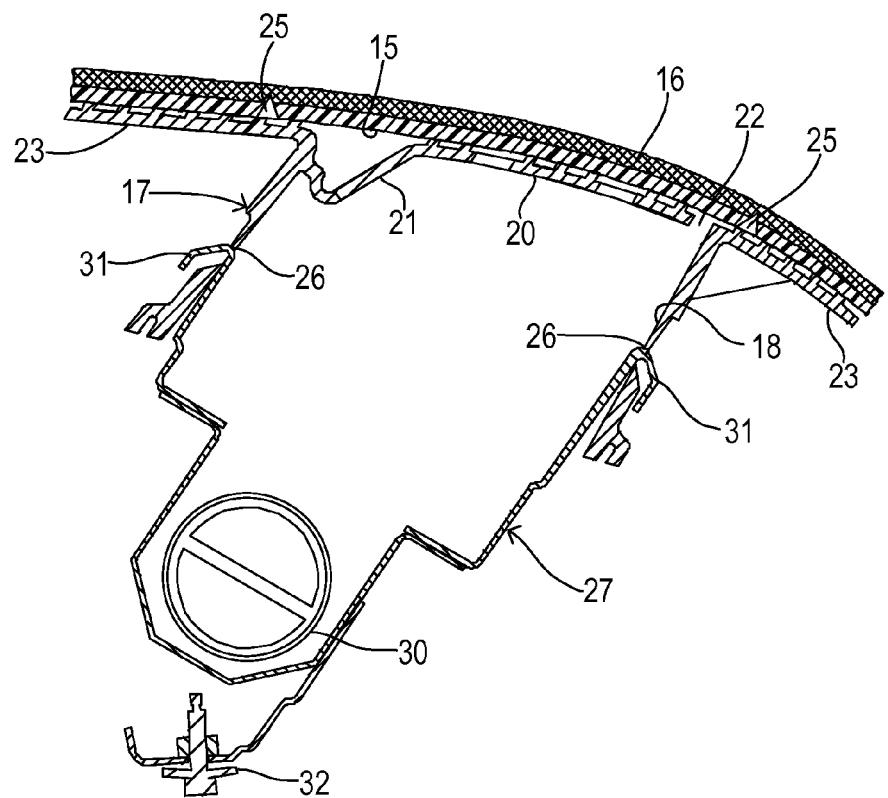
FIG. 2 is a cross-sectional view along line 2-2 of FIG. 1 showing a passenger air bag system.

Referring now to FIG. 1, an instrument panel 10 includes a passenger air bag system with a hidden seam 11 defining a deployment door area 12. FIG. 2 depicts one type of prior art air bag system in a view taken along line 2-2 of FIG. 1. An instrument panel substrate 15 provides the desired shape and rigidity for the instrument panel. It is overlaid by a cover layer 16 which may include a conventional elastomeric skin and a layer of foam between the skin and substrate 15. A chute 17 includes a tubular passageway 18 and a deployment door 20 at the upper end thereof. Deployment door 20 is coupled to passageway 18 by a hinge 21 along one side. A gap 22 may define an outer edge on three sides of door 20, for example. Instead of a gap, a pre-weakened seam may be employed. Chute 17 includes a flange 23 surrounding door 20. As better shown in FIG. 3, flange 23 and door 20 have a plurality of ribs 24 for welding chute 17 to instrument panel substrate 15.

As shown in FIG. 2, instrument panel substrate 15 and covering layer 16 may include a hidden seam 25 for tearing during opening of deployment door 20. Seam 25 may be formed by mechanical or laser scoring prior to attachment of chute 17 by vibration welding. An air bag module 27 is mounted to a plurality of holes 26 in chute passageway 18. Air bag module 27 is comprised of a rigid box containing a propellant source 30 and a folded bag (not shown) that is guided via passageway 18 to door 20 upon inflation by gases from propellant source 30. Air bag module 27 includes a plurality of hooks 31 that are received in a corresponding plurality of windows 26. A fastener 32 couples air bag module 27 to a cross-car beam via a bracket.

Figure 3:
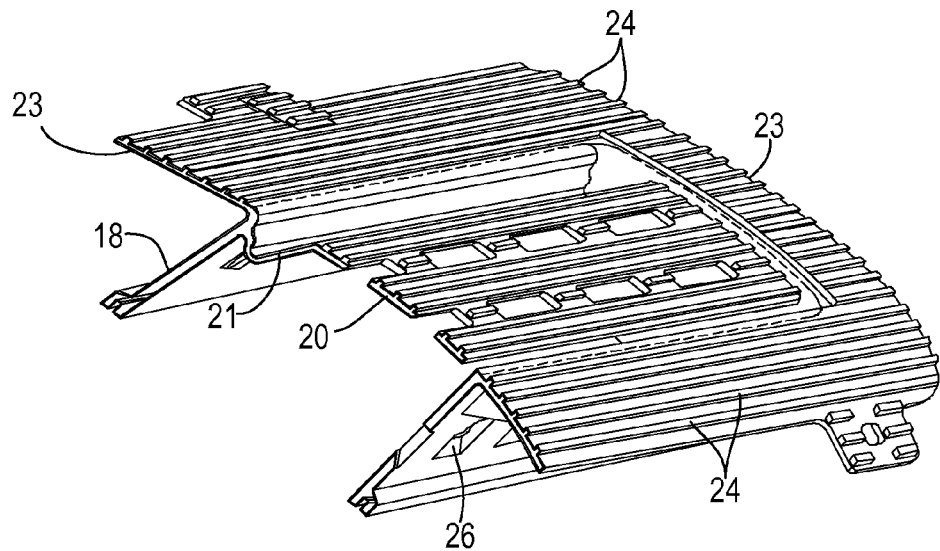
FIG. 3 is a perspective view of a cross-sectioned air bag chute according to the prior art.
Figure 4:
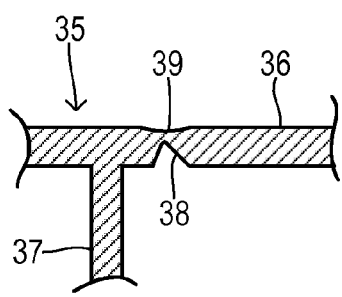
FIG. 4 shows a cross section of an in-mold tear seam of an injection molded instrument panel substrate.

The construction as shown in FIGS. 2 and 3 requires several individual components and many processing steps to manufacture. In order to attempt to reduce the component count and manufacturing steps, an integrally molded substrate and chute could be used. As shown in FIG. 4, an instrument panel substrate 35 may be molded as a single component having a deployment door 36 and an integrated chute passageway 37 for mounting the air bag module (not shown). The injection molded article includes an in-mold tear seam 38 defining a perimeter of deployment door 36. However, substrate 35 is subject to having a read-through groove 39 forming opposite tear seam 38. Groove 39 prevents the visible Class A surface of substrate 35 from being sufficiently smooth.

Figure 5:
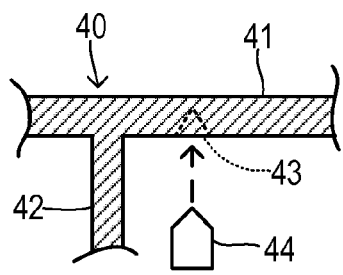
FIG. 5 shows a cross section of an instrument panel substrate in which a tear seam is created by a cutting process.

This visible seam line has prevented successful adoption of injection molding to manufacture an instrument panel substrate unless the tear seam is formed subsequent to molding of the parts as is depicted in FIG. 5. An instrument panel substrate 40 includes a door section 41 and a chute section 42. Substrate 40 is molded with an outer wall of substantially constant thickness (i.e., without an in-mold tear seam) so that an outer Class A surface is smoothly formed without any defects. In a subsequent processing step, a tear seam 43 is formed by scoring or cutting using a cutting device 44 which may include a mechanical knife or a laser beam, for example.

Figure 6:
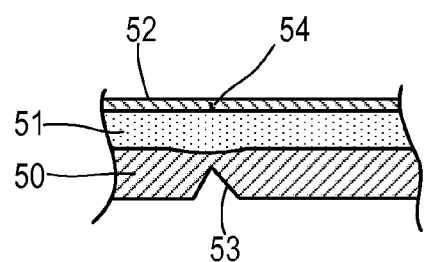
FIG. 6 shows a cross section of an instrument panel substrate with covering layers.

As shown in FIG. 6, an injection molded instrument panel substrate 50 having an in-mold tear seam 53 can be used if the corresponding read-through defect is covered by a foam layer 51 and a skin 52. To facilitate tearing, skin 52 may be separately scored prior to injection of the foam to form a cut 54. Scoring of foam layer 50 may also be required. Thus, significant processing is required in order to obtain an invisible tear seam.

Figure 7:
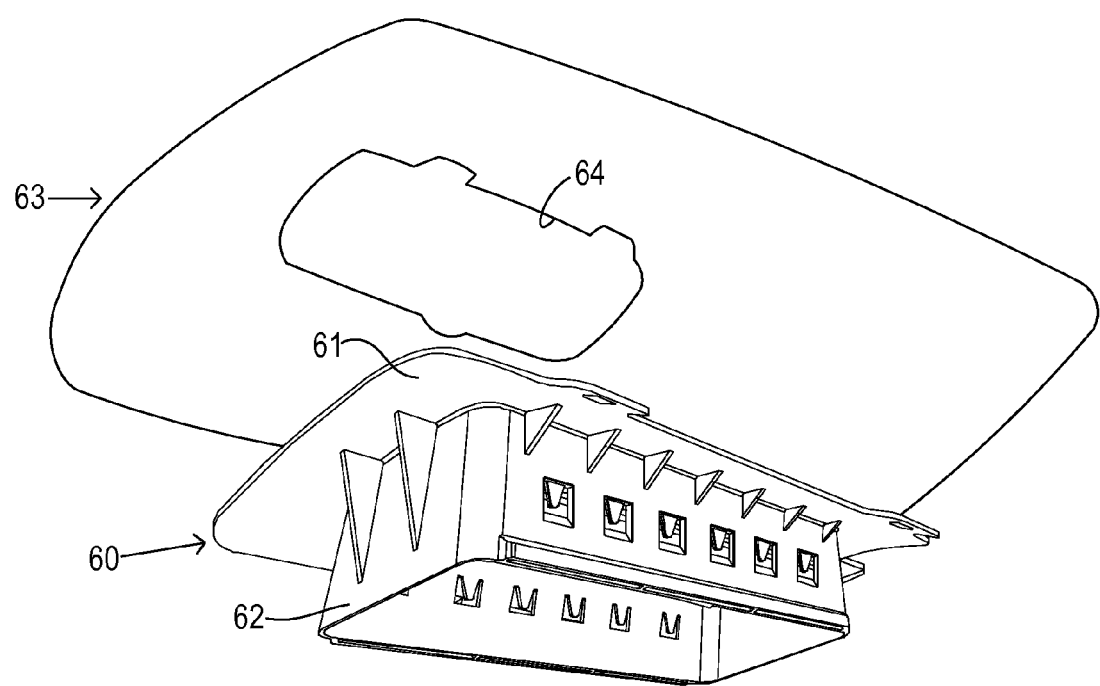
FIG. 7 is a perspective view of an air bag chute and a die for insert molding the chute onto an instrument panel substrate.
Figure 8:
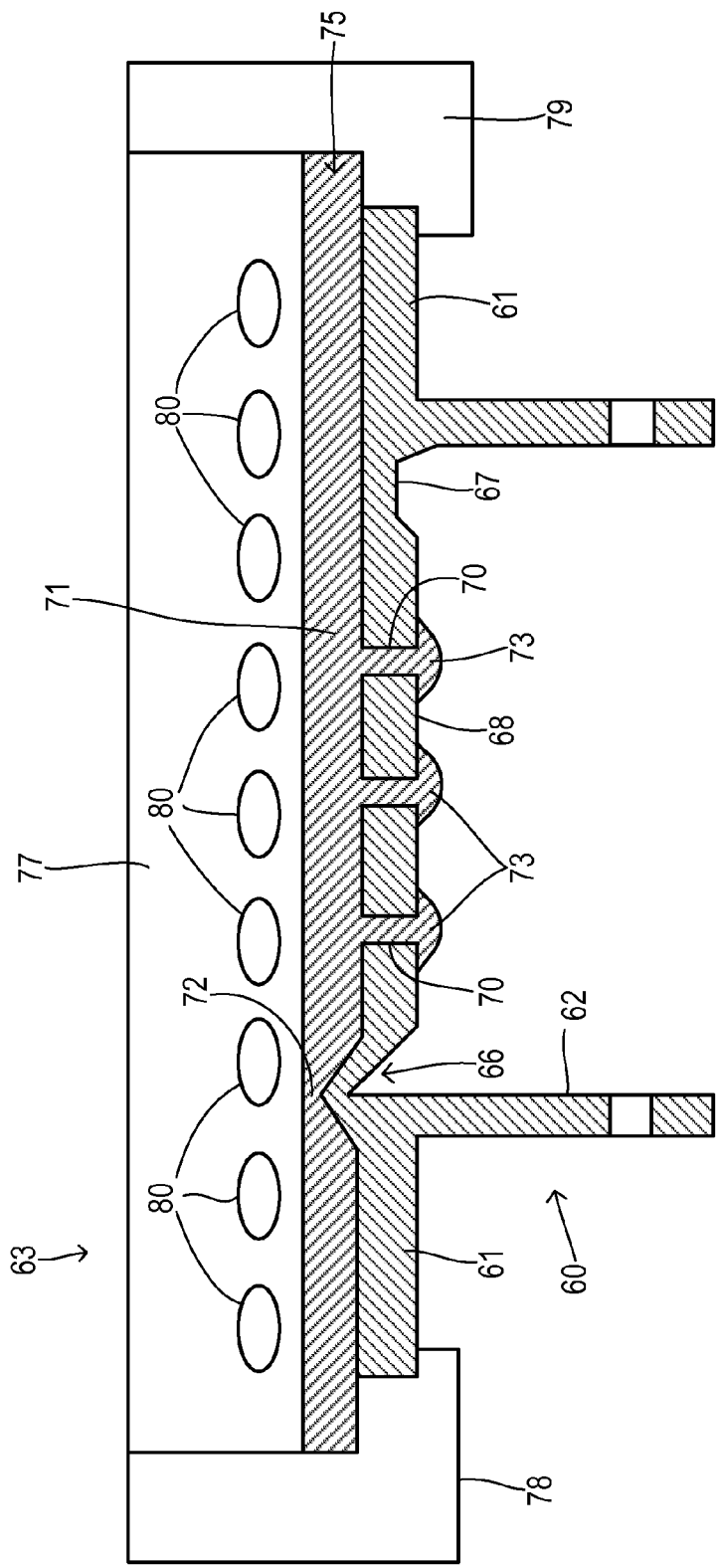
FIG. 8 is a cross-sectional view of a chute, instrument panel substrate, and a die for performing insert molding.

An improved automotive air bag system of the invention is shown in FIGS. 7 and 8. A chute 60 includes a flange portion 61 and a passage section 62. In order to attach it to an instrument panel substrate, chute 60 is insert molded at the time the instrument panel substrate is formed in a die 63 (FIG. 7). Die 63 includes a cavity 64 into which chute 60 is fitted. As shown in FIG. 8, die 63 may include a main section 77 and closure sections 78 and 79 to cooperatively define a cavity 75 that is bound along a lower edge by chute 60.

Chute 60 includes an in-mold tear seam 66 preferably extending around three sides of a deployment door 68 having a living hinge 67 extending along its remaining side. In-mold tear seam 66 has a tip extending toward instrument panel substrate 71. Deployment door 68 may preferably include a plurality of through holes 70 to receive injected material during formation of instrument panel substrate 71 so that the strength of attachment is improved. As described in more detail below, moldable thermoplastic flows into cavity 75 to provide a substantially smooth outer surface (i.e., a Class A surface against die section 77). The flowing thermoplastic fully covers in-mold tear seam 66 at a region 72 and flow through holes 70 to form tabs 73. The upward extension of the tip into instrument panel substrate 71 results in molding instrument panel substrate 71 with a narrowed thickness without a read-through defect on the smooth outer surface. Due to a particular relationship of melting temperatures discussed below, instrument panel substrate 71 and chute 60 become strongly bonded.

For obtaining a desired strength and appearance, instrument panel substrate 71 and chute 60 may be preferably formed of moldable thermoplastic materials. Preferred materials include thermoplastic polyolefin (TPO), Thermal Plastic Elastomers (TPE), and Thermal Plastic Elastomer Olefin (TEO). The most preferred material is TPO compounded with fillers that modify the material's melting temperature, flexural modulus (i.e., stiffness), and other properties. The compounded material used for forming chute 60 has a melting temperature lower than the melting temperature of the material injected to form instrument panel substrate 71. During injection of the moldable thermoplastic into cavity 75 for forming instrument panel substrate 71, partial melting of chute 60 occurs in order to produce a strong bond between the components. Without any secondary processing, both a tear seam and a smooth Class A surface are obtained.

In a most preferred embodiment, both chute 60 and substrate 71 are formed from compounded TPO. By providing different filler compositions and/or concentrations, different melting temperatures can be obtained. In addition, a different flexural modulus may typically result, wherein a higher melting temperature is accompanied by a higher flexural modulus (i.e., a stiffer material). To ensure that the deployment door operates with sufficient stiffness for proper airbag deployment, substrate 71 (which is the stiffer material) employs a TPO compound with a sufficiently high flexural modulus.

Fillers used in the moldable thermoplastics may include particles of rubber, talc, and/or glass. For example, an increasing concentration of rubber correspondingly lowers both the melting temperature and the flexural modulus.

In a preferred embodiment, the moldable thermoplastic material of chute 60 has a melting temperature of about of 380° F. The moldable thermoplastic utilized for substrate 71 preferably has a melting temperature of about 420° F. When the hotter substrate material is injected over the chute material, the outer surface of the chute material is at least partially melted and the materials bond to a depth of about 0.5 mm during the injection process.

As shown in FIG. 8, die 63 may preferably include the plurality of heating and/or cooling elements 80. Elements 80 may be comprised of channels cut through the solid body of die 63 for carrying heated or cooled fluids. Alternatively, elements 80 may be resistive heating elements. According to a preferred method, an airbag chute is molded from a first moldable thermoplastic having a first melting temperature. The chute is placed into a cavity of the die, wherein the die cavity defines an instrument panel substrate having a substantially smooth outer surface for facing a passenger compartment of a vehicle. A second moldable thermoplastic is injected into the cavity to form the instrument panel substrate. The substrate becomes bonded to the chute as a result of the second moldable thermoplastic having a higher melting temperature which causes partial melting of the chute material at the interface. In one embodiment, heat is introduced by the heating element into the second moldable thermoplastic during injection into the cavity. Preferably, the die is heated to slightly less than the melting temperature of the substrate material, such as about 375° F. The supplemental heating helps ensure a laminar flow of the second moldable thermoplastic and helps achieve a smooth appearance on the Class A surface. By heating the cavity, injected material stays fluid longer and flow fronts are evened out.

The smooth surface of the substrate is also useful for foam-in-place instrument panels since in some instances substrate defects can still be apparent through the foam and skin (e.g., the present invention can prevent read-through of defects that can result from defect-induced voids in the flow of the foam).

The more rigid (i.e., hard layer) of TPO over the top of the insert-molded TPO chute of the invention provides a rigid door construction. A further benefit of the rigid door construction is the reduction of "oil canning" which is an in and out movement caused when an occupant presses against the instrument panel. Moreover, the rigid door construction improves transfer of energy from the air bag to the substrate resulting in a cleaner opening of the door.

What is claimed is:
1. An automotive air bag system for a vehicle, comprising:
an instrument panel substrate comprising a first moldable thermoplastic characterized by a first melting temperature, wherein the instrument panel substrate has a sub- stantially smooth outer surface concealing an air bag deployment door and facing a passenger compartment of the vehicle; and a chute comprising a second moldable thermoplastic characterized by a second melting temperature lower than the first melting temperature, wherein the chute includes an in-mold tear seam and a hinge for the air bag deployment door, wherein the in-mold tear seam has a tip extending toward the instrument panel substrate, wherein the chute includes a passageway for guiding an inflating air bag to the deployment door, wherein the chute is attached to an inner surface of the instrument panel substrate by insert molding in which injection of the first moldable thermoplastic caused a partial melting of the second moldable thermoplastic, and wherein extension of the tip results in molding the instrument panel substrate with a narrowed thickness without a read-through defect on the smooth outer surface.

2. The system of claim 1 wherein the smooth outer surface is a Class A surface.

3. The system of claim 1 wherein the first moldable thermoplastic has a first flexural modulus and wherein the second moldable thermoplastic has a second flexural modulus less than the first flexural modulus, whereby the first flexural modulus ensures that the deployment door tears along the in-mold tear seam upon deployment of the air bag.

4. The system of claim 1 wherein the deployment door has a plurality of apertures, each aperture substantially filled with the first moldable thermoplastic of the instrument panel substrate injected by the insert molding.

5. The system of claim 1 wherein the first moldable thermoplastic and the second moldable thermoplastic are comprised of thermoplastic olefin (TPO) together with fillers for providing a difference between the first and second melting temperatures.

6. The system of claim 5 wherein the fillers are selected from the group comprising rubber, talc, and glass.

7. The system of claim 1 wherein the first moldable thermoplastic and the second moldable thermoplastic are comprised of thermoplastic elastomer together with fillers for providing a difference between the first and second melting temperatures.

8. The system of claim 7 wherein the fillers are selected from the group comprising rubber, talc, and glass.

9. A method of manufacturing an instrument panel system for an automotive vehicle having an air bag, comprising the steps of:

molding a first moldable thermoplastic to form an air bag chute, the first moldable thermoplastic characterized by a first melting temperature, wherein the chute is molded with an in-mold tear seam and a hinge for an air bag deployment door, wherein the in-mold tear seam has a tip extending upward, and wherein the chute includes a passageway for guiding an inflating air bag to the deployment door;

placing the chute into a cavity of a die defining an instrument panel substrate with a substantially smooth outer surface for facing a passenger compartment of the vehicle;

injecting a second moldable thermoplastic into the cavity to form the instrument panel substrate bonded to the chute, wherein the second moldable thermoplastic is characterized by a second melting temperature higher than the first melting temperature, whereby a partial melting of the first moldable thermoplastic creates a bond between the chute and the instrument panel substrate, and wherein extension of the tip results in molding the instrument panel substrate with a narrowed thickness without a read-through defect on the smooth outer surface.

10. The method of claim 9 wherein the die includes a heating element, and wherein heat is introduced into the second moldable thermoplastic by the heating element during injection into the cavity.

11. The method of claim 9 wherein the first moldable thermoplastic has a first flexural modulus and wherein the second moldable thermoplastic has a second flexural modulus greater than the first flexural modulus, whereby the second flexural modulus ensures that the deployment door tears along the in-mold tear seam upon deployment of the air bag.

12. The method of claim 9 wherein the chute has a plurality of apertures within the deployment door, each aperture substantially filled with the second moldable thermoplastic of the instrument panel substrate during injection of the second moldable thermoplastic.

13. The method of claim 9 wherein the first moldable thermoplastic and the second moldable thermoplastic are comprised of thermoplastic olefin (TPO) together with fillers for providing a difference between the first and second melting temperatures.

14. The method of claim 13 wherein the fillers are selected from the group comprising rubber, talc, and glass.

15. The method of claim 9 wherein the first moldable thermoplastic and the second moldable thermoplastic are comprised of thermoplastic elastomer together with fillers for providing a difference between the first and second melting temperatures.

16. The method of claim 15 wherein the fillers are selected from the group comprising rubber, talc, and glass.

* * * * *